Figure 1:
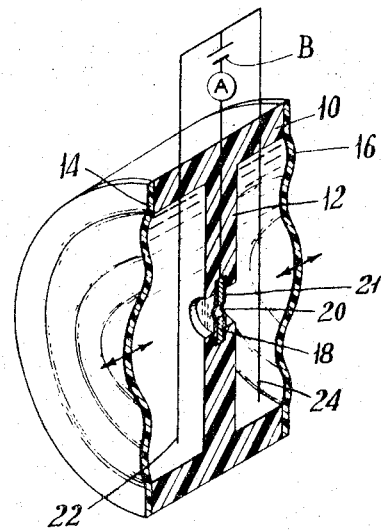

March 14, 1967 R. A. POWERS ET AL 3,309,584
INERT ELECTRODES FOR ELECTROCHEMICAL DEVICES
Filed Nov. 18, 1963

INVENTORS
ROBERT A. POWERS
DEMETRIOS V. LOUZOS
WILLIAM G. DARLAND, JR.

BY
ATTORNEY

United States Patent Office 3,309,584
Patented Mar. 14, 1967

3,309,584
INERT ELECTRODES FOR ELECTROCHEMICAL
DEVICES
Robert A. Powers, Lakewood, Demetrios V. Louzos,
Rocky River, and William G. Darland, Jr., Parma,
Ohio, assignors to Union Carbide Corporation, a corporation of New York
Filed Nov. 18, 1963, Ser. No. 324,275
10 Claims. (Cl. 317—231)

This invention relates to electrodes for electrochemical devices. This application is a continuation-in-part of U.S. application Ser. No. 34,969, filed on June 9, 1960 and now abandoned.

A family of electrochemical devices which utilize solutions of ions has recently attracted considerable favorable attention. These devices have been termed "solions." Typical solions are described in a paper by Hurd and Lane, "Principles of Very Low Power Electrochemical Control Devices," "Journal of the Electrochemical Society," vol. 104, No. 12, December 1957.

Solions function by electrolytic transfer of at least one chemical species in a reversible redox system in which measurement of the transfer of one of such species is made, the solion device itself generally comprising a unit of two compartments containing an electrolyte solution of the species in a solvent, which compartments are connected through an electrolytically conductive path such as a porous partition. Typical solion devices of this kind are described and claimed in United States Patent No. 2,890,414, entitled Electrochemical Coulometer, issued to Earl S. Snavely, Jr., on June 9, 1959; and United States Patent No. 3,056,908, entitled Electrochemical Detector, issued to N. N. Estes et al. on Oct. 2, 1962.

Solion devices are best typified by their highly sensitive response to very low power inputs. Illustratively, solion electrochemical detectors have been developed which convert signals such as a very low acoustical pressure into electrical current. One type of solion detector, for instance, known as a "log detector," has the property that the electrical current is a logarithmic function of the applied acoustic pressure.

Generally, a log detector of this type comprises a pair of compartments having as one wall thereof a flexible diaphragm and containing an electrolyte solution of a reversible redox system. The compartments are separated by a partition having an aperture within which is mounted a detecting micro-electrode. The detecting electrode has a tiny orifice through which the electrolyte solution flows from one compartment to the other. Electrodes are mounted in the compartments and are usually made the anodes in an external biasing circuit. The detecting electrode is then made the cathode. When properly biased, a measured species, i.e., reducible ions, of the redox system slowly diffuses to the detecting cathode where it undergoes electrochemical reduction. If an acoustical pressure is then applied to one of the diaphragms in the compartments, the solution in that compartment tends to flow through the orifice, thereby making a greater quantity of the measured species available for reaction at the cathode. Thus, in response to a pressure, an electric current is produced and can be measured. The current observed at a fixed voltage increases with applied pressure and is a logarithmic function of the pressure input.

It should be pointed out that the detecting cathode and more particularly the cathode orifice is quite small, being on the order of about 0.01 inch in diameter, and that consequently the log detector is highly sensitive and will produce a noticeable response even though only a few species or ions from whatever source are brought into the vicinity of the cathode.

In typical log detectors and other solion devices, platinum electrodes are usually employed. While certainly a noble metal and one that is highly inert to most solutions, platinum has been found to possess a tendency to react with the electrolyte of a reversible redox system and to go into solution in the electrolyte when used as the anode. The platinum ions so produced migrate through the electrolyte or are carried by the flow of solution to the cathode where they are reduced, producing an extraneous response or otherwise affecting the behavior of the detector.

It is therefore the principal object of the invention to provide a more stable and electrolyte-inert electrode for use in solion devices.

It is another object of the invention to provide a solion device characterized in that the anode is stable, inert and will not go into solution within the electrolyte of the reversible redox system.

Figure 2:
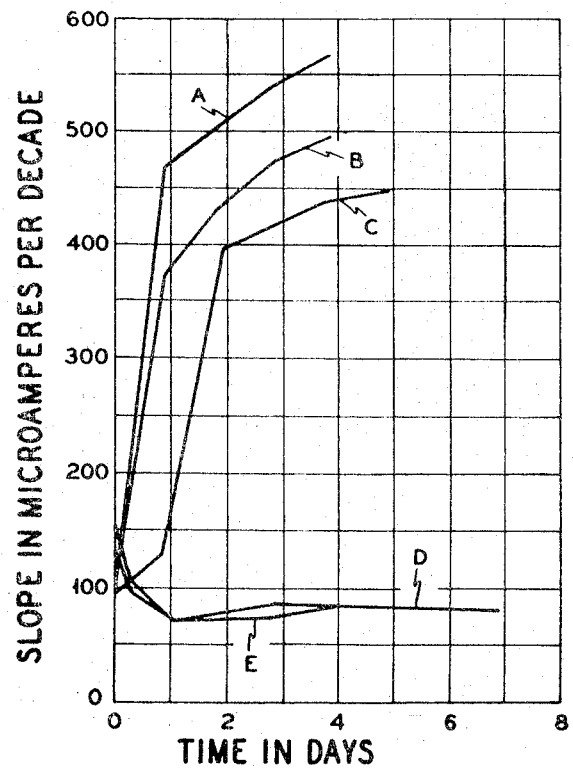

The invention will be described with reference to the accompanying drawing in which:

FIG. 1 is a vertical sectional view of a typical solion, provided with electrodes embodying the invention; and FIG. 2 is a group of curves comparing the stability of performance of solions illustrated in FIG. 1 provided with different types of electrodes.

The invention comprises a solion device having an electrode and more particularly an anode, at least the active surface portions of which are composed of a material selected from the group consisting of the carbides, nitrides, silicides, and borides of the transition metals selected from Groups IVB, VB, and VIB of the Periodic Table. Anodes made in accordance with the invention represent a distinct improvement in the important characteristic of electrolyte-inertness over anything which, so far as is known, has heretofore been suggested or utilized.

It is known that transition metals from Groups IVB, VB, and VIB of the Periodic Table, namely, titanium, niobium, molybdenum, zirconium, hafnium, tantalum, tungsten, chromium, and vanadium react under certain conditions to form metal carbides, nitrides, silicides, and borides. These materials, as it has been found, are outstanding for use as anodes in solions because they possess excellent electrical conductivity and a very high resistance to chemical and electrochemical reactivity. They are virtually inert to the electrolyte solution of a solion.

While it is to be understood that the anodes of the invention may be formed entirely of the transition metal compound selected, it is convenient and practical to prepare a thin coating of the compound desired on a substrate of the transition metal. For example, a thin wire or ribbon of tantalum metal may be prepared with a thin coating of tantalum carbide according to well known techniques. Anodes so prepared are often preferred because they are generally less brittle and much easier to handle. Of the transition metals, tantalum, zirconium, niobium, and hafnium are the preferred metals for the composite anodes. Among these metals, tantalum is preferred. These transition metals are preferred because they have a tendency to passivate in the electrolyte of a solion device so that in the event a part of the metal substrate contacts the electrolyte, it will not corrode or cause erratic behavior of the solion.

Useful transition metal compounds for the anodes of the invention may be represented by the following, it being understood that the compounds listed are those of particular interest and that they are in no way limitative of the invention:

| Carbides | Nitrides | Silicides | Borides |
|---|---|---|---|
| TaC | TiN | TaSi$_2$ | TiB$_2$ |
| NbC | ZrN | TiSi$_2$ | TiB |
| Mo$_2$C | NbN | ZrSi$_2$ | ZrB$_2$ |
| W$_2$C | Nb$_2$N | Cr$_3$Si$_2$ | ZrB |
| WC | TaN | | NbB$_2$ |
| ZrC | CrN | | NbB |
| VC | | | TaB$_2$ |
| HfC | | | TaB |
| TiC | | | Mo$_2$B |
| Cr$_3$C$_2$ | | | αMoB |
| | | | βMoB |
| | | | Mo$_2$B$_5$ |
| | | | MoB$_2$ |
| | | | CrB |

A number of anodes for use in solion devices have been made, the active electrolyte-contacting surface portions of which were composed of tantalum carbide, molybdenum carbide, and niobium carbide to mention a few. Tantalum carbide anodes were prepared for instance by electrically heating a thin tantalum wire to temperatures as high as 2900° C. in a carbonaceous, non-oxidizing atmosphere. The anodes in each instance were made from thin wires approximately 0.02 inch in diameter.

Anodes so prepared according to the invention have been employed in solion devices and tested over a wide range of conditions. Referring to the drawing, a log detector of the type illustrated in FIG. 1 was used in the testing program. It comprises a housing 10 which is divided into two compartments by an apertured partition 12, each of the compartments having as one wall thereof one of a pair of flexible diaphragms 14, 16. An electrode 18 having a tiny orifice 20 at its center and insulated, except at the orifice 20, by a layer 21 of soft glass is mounted in the partition 12, access between the two compartments being solely through the tiny orifice 20. The two compartments are filled with a liquid electrolyte composed of a redox system such as potassium iodide-iodine. A pair of electrodes 22, 24, one of each of which is situated in each compartment, is connected to a biasing circuit including a battery B, the electrodes 22, 24 being the anodes. The electrode 18 is connected through an ammeter A to the biasing circuit and is made the detecting cathode of the device. When the device is properly biased and a pressure, such as an acoustical pressure, is applied to either of the diaphragms 14, 16, liquid tends to flow through the orifice 20 of the detecting cathode 18. This causes a flow of current through the biasing circuit which is measured by the ammeter A.

In the tests, solion log detectors of the type just described were provided with anodes composed of a tantalum metal substrate having a surface coating of tantalum carbide thereon and were compared with similar log detectors provided with platinum anodes in the form of wires .010 inch in diameter. The log detectors used in the tests were filled with a solution of a potassium iodide-iodine redox electrolyte of the following composition: 2.0 N KI+0.17 N I$_2$+0.01% disodium salt of ethylenediamine tetraacetic acid. The log detectors were tested at room temperature, about 77° F., over an acoustic pressure range up to 2000 dynes/cm.$^2$ root mean square. Between test periods, the log detectors were stored at 140° F. The bias voltage of the log detectors was maintained at about 0.9 volt. The test lasted for seven to eight days. Under the above test conditions, it is desirable that the slope of the current versus log acoustic pressure curve produced in the biasing circuit be maintained at a relatively constant value.

The results of these tests are presented graphically in FIG. 2 of the drawing. The several curves there shown depict the performance of the log detectors in the tests as measured by the log slope in microamperes of electrical current per decade of applied acoustic pressure. It will be understood that a flat horizontal curve represents the optimum stability of operation for a log detector. Curves A, B, and C are curves of log detectors provided with platinum anodes. It will be observed that the slope of the current produced versus applied pressure rose abruptly during the first two days of operation for each log detector and, although less abruptly, kept rising for several days thereafter. In contrast, the current versus applied pressure curves for log detectors provided with tantalum carbide anodes, curves D and E, are outstanding. Thus, after the first day of operation, the current versus pressure slope was nearly flat, indicating that with respect to a given applied pressure the current signal produced in the biasing circuit was relatively constant.

It has been demonstrated that the relatively poor performance of platinum anodes is due to the fact that visible amounts of platinum went into solution in the electrolyte during the test and were deposited on the surface of the detecting cathode orifice, whereby erratic behavior of the log detector resulted. Tantalum carbide is virtually inert in the electrolyte and hence this phenomena did not occur when tantalum carbide anodes were substituted for the platinum anodes in the log detectors.

Thus, from the foregoing, it will be evident that compounds selected from the group consisting of the carbides, nitrides, silicides, and borides of the transition metals selected from Groups IVB, VB, and VIB of the Periodic Table are excellent materials for use as anodes in solions. Besides the potassium iodide-iodine electrolyte mentioned above, the anodes of the invention may be used in conjunction with solutions containing other reversible redox systems: for instance, the ferrocyanide-ferricyanide and the cerous-ceric systems.

A standard Periodic Table is described in "Handbook of Chemistry," by Lange, 9th edition, published 1956, pp. 56 and 57, and is to be referred to in the classification of the transition metals which may be used in the practice of the invention.

Although the invention has been described herein with particular reference to a log detector, it is to be understood that anodes of the transition metal compounds may be used in other solion devices, for instance, those described in the above referred to paper by Hurd and Lane. The anodes find particular use, however, in log and linear detectors, such as described herein and in United States Patent 3,056,908 supra. They may also be used in integrators, of the type, for instance, those of the type described and claimed in United States Patent 3,021,482, issued to N. N. Estes on Feb. 13, 1962.

What is claimed is:

1. In a solion of the type having an anode and a cathode in contact with an electrolyte solution of a reversible redox system; the improvement whereby trace quantities of impurities present in said electrolyte solution are reduced, said improvement comprising an anode having at least the active surface portions thereof composed of a material selected from the group consisting of the carbides, nitrides, silicides, and borides of a transition metal selected from the group consisting of titanium, niobium, molybdenum, zirconium, hafnium, tantalum, tungsten, chromium and vanadium.

2. A solion as defined by claim 1 in which said anode comprises tantalum carbide.

3. A solion as defined by claim 1 in which said anode comprises niobium carbide.

4. A solion as defined by claim 1 in which said anode comprises a substrate of a transition metal selected from the group consisting of titanium, niobium, molybdenum, zirconium, hafnium, tantalum, tungsten, chromium and vanadium and a surface layer of a compound selected from the group consisting of the carbides, nitrides, silicides, and borides of one of said group of transition metals.

5. A solion as defined by claim 1 in which said anode comprises a substrate of tantalum and a surface layer of tantalum carbide.

6. A solion of the type which functions by electrolytic transfer of at least one chemical species in a reversible redox system and in which measurement of the transfer of one of such species is made, which solion comprises a unit of two compartments connected through an electrolytically conductive path, and in said compartments, electrodes and an electrolyte containing a solution of said species in a solvent, means for biasing at least one of said electrodes to constitute an anode and said anode comprising a material selected from the group consisting of the carbides, nitrides, silicides, and borides of a transition metal selected from the group consisting of titanium, niobium, molybdenum, zirconium, hafnium, tantalum, tungsten, chromium and vanadium.

7. In an electrochemical detector comprising a pair of compartments having as one wall thereof one of a pair of flexible diaphragms, said compartments being separated by an apertured partition and containing an electrolyte solution of a reversible redox system, and a detecting cathode mounted in the aperture of said partition; the improvement whereby trace quantities of impurities present in said electrolyte solution are reduced, said improvement comprising an anode mounted in each of said compartments, said anode being composed of a material selected from the group consisting of the carbides, nitrides, silicides and borides of a transition metal selected from the groups consisting of titanium, niobium, molybdenum, zirconium, hafnium, tantalum, tungsten, chromium and vanadium.

8. A detector as defined by claim 7 in which said anode comprises tantalum carbide.

9. A detector as defined by claim 7 in which said detecting cathode has a tiny orifice for the transmission of solution from one compartment to the other.

10. A detector as defined by claim 7 in which said reversible redox system is iodide-iodine.

References Cited by the Examiner
UNITED STATES PATENTS

| | | | |
|---|---|---|---|
| 2,908,849 | 11/1959 | Taylor | 317—230 |
| 3,021,482 | 2/1962 | Estes | 317—231 |
| 3,123,749 | 3/1964 | Louzos et al. | 317—231 |
| 3,126,504 | 3/1964 | Darland et al. | 317—231 |
| 3,163,806 | 12/1964 | Estes et al. | 317—231 |

JAMES D. KALLAM, *Primary Examiner.*